(12) United States Patent
Abe

(10) Patent No.: US 7,322,332 B2
(45) Date of Patent: Jan. 29, 2008

(54) INTAKE SYSTEM OF MULTI-CYLINDER ENGINE

(75) Inventor: Kazuyoshi Abe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/079,181

(22) Filed: Mar. 15, 2005

(65) Prior Publication Data

US 2005/0252475 A1 Nov. 17, 2005

(30) Foreign Application Priority Data

May 12, 2004 (JP) .............................. 2004-142483

(51) Int. Cl.
*F02M 35/10* (2006.01)
(52) U.S. Cl. ................................. 123/184.34
(58) Field of Classification Search ........... 123/184.34, 123/184.31, 184.35, 184.36
See application file for complete search history.

(56) References Cited

U.S. PATENT DOCUMENTS

| | | | |
|---|---|---|---|
| 4,649,871 A | | 3/1987 | Hatamura et al. |
| 4,708,097 A | * | 11/1987 | Hatamura et al. ..... 123/184.36 |
| 4,919,087 A | * | 4/1990 | Ogami et al. ............... 123/54.6 |
| 4,970,994 A | * | 11/1990 | Sawada et al. ......... 123/184.35 |
| 5,263,440 A | * | 11/1993 | Bodnar et al. ......... 123/184.59 |
| 6,901,890 B2 | * | 6/2005 | Sato ......................... 123/41.31 |
| 7,025,029 B2 | | 4/2006 | Vichinsky et al. |

FOREIGN PATENT DOCUMENTS

| | | |
|---|---|---|
| DE | 196 05 308 A1 | 8/1997 |
| EP | 0 155 685 B2 | 8/1992 |
| JP | A 3-107520 | 5/1991 |
| JP | A 3-286133 | 12/1991 |
| JP | A 4-121224 | 4/1992 |
| JP | A 4-124456 | 4/1992 |
| JP | A 4-276172 | 10/1992 |

\* cited by examiner

*Primary Examiner*—Stephen K. Cronin
*Assistant Examiner*—Hyder Ali
(74) *Attorney, Agent, or Firm*—Oliff & Berridge, PLC

(57) ABSTRACT

An intake system of a V-engine provided with a surge tank arranged at a position higher than a cylinder head and divided in internal space into a top part and a bottom part. The surge tank has a plurality of intake tubes communicating the surge tank and intake ports, wherein intake tubes communicated with one cylinder bank of the V-engine are connected to the top part of the surge tank and intake tubes communicated with the other cylinder bank are connected to the bottom part of the surge tank. The surge tank is formed so that a front end of the top part is positioned further toward a rear side of the vehicle compared with the front end of the bottom part when the intake system is mounted to a V-engine mounted in the vehicle, whereby the height of the engine hood can be effectively lowered.

2 Claims, 7 Drawing Sheets

INTAKE SYSTEM OF MULTI-CYLINDER ENGINE

BACKGROUND OF THE INVENTION

1. Field of the Invention

The present invention relates to an intake system of a multi-cylinder engine.

2. Description of the Related Art

In a multi-cylinder engine provided with two cylinder banks each comprised of a plurality of cylinders, for example, a V-engine, it is necessary to arrange the surge tank above the engine for structural reasons. This is because with a V-engine, the intake ports are provided above the center of the structure and because the surge tank has to be arranged near the intake ports from the viewpoint of the intake efficiency or the layout of the intake pipe and exhaust pipe, etc.

In this way, since the surge tank is arranged above a V-engine, when placing the engine and the surge tank in the engine compartment, the position of the engine hood inevitably ends up becoming high. In particular, if also considering the need to provide a cushion material etc. between the engine hood and the tops of the engine body and the surge tank from the viewpoint of protecting pedestrians, the engine hood has to be positioned higher, and thus the possibility of changes in vehicle design is limited.

In general, from the viewpoint of securing the field of vision of the vehicle driver, the engine hood usually has to be made to incline downward toward the front of the vehicle. To make the height of the engine hood as a whole lower, it is necessary to make the height of the engine hood lower at the front region of the engine hood. In the intake system of the V-engine disclosed in Japanese Unexamined Patent Publication (Kokai) No. 4-121224, the surge tank is provided above the center of the two cylinder banks of the V-engine and facing throttle valves are provided at the two sides of the rear end of the surge tank. Due to this, it becomes possible to arrange the surge tank further to the rear. Further, the surge tank is formed so that its top surface is inclined downward toward the front of the vehicle when the surge tank is arranged above the center of the V-engine. By forming the surge tank in this way, the height of the engine hood is effectively made lower at the front region of the engine hood.

However, there is a surge tank which is divided in its internal space into a top part and a bottom part and provided with a partition between the top part and the bottom part. Further, in such a surge tank, the intake tubes connected to one cylinder bank of the V-engine are connected to the top part, while the intake tubes connected to the other cylinder bank are connected to the bottom part. Further, an opening communicating the top part and bottom part is provided at part of the partition in the surge tank. A valve for opening/closing the opening is provided in the opening. By operating this valve, the effective intake pipe length, which has an effect on the period of the intake pulsation occurring in the intake passage, is changed. It is possible to use this to raise the charging efficiency by the pulsation effect.

In this way, even when using a surge tank with an internal space divided into a top part and bottom part, the height of the engine hood has to be made lower. If however forming a surge tank so that its top surface inclines downward toward the front of the vehicle as described in Japanese Unexamined Patent Publication (Kokai) No. 4-121224, at the front region of the surge tank, the top part and bottom part of the surge tank end up becoming extremely thin. Therefore, in this case, it is difficult to make intake tubes branch from the sides of the top part and bottom part in the front region of the surge tank.

SUMMARY OF THE INVENTION

An object of the present invention is to provide an intake system of a multi-cylinder engine effectively enabling the height of the engine hood to be made lower even when using a surge tank with an internal space divided into a top part and a bottom part.

In one embodiment of the present invention, there is provided an intake system of a multi-cylinder engine provided with two cylinder banks each comprised of a plurality of cylinders, provided with a surge tank arranged at a position higher than cylinder heads of the multi-cylinder engine when the intake system is attached to the multi-cylinder engine and divided in internal space into a top part and a bottom part and with pluralities of intake tubes communicating the surge tank and intake ports of said multi-cylinder engine; intake tubes communicated with one cylinder bank of the multi-cylinder engine being connected to the top part of the surge tank and intake tubes communicated with the other cylinder bank being connected to the bottom part of the surge tank; the surge tank being formed so that a front end of the top part is positioned further toward a rear side of the vehicle compared with a front end of the bottom part when the intake system is mounted to a multi-cylinder engine mounted in the vehicle.

According to this embodiment, the front end of the top part is formed positioned further to the rear of the vehicle compared with the front end of the bottom part. Therefore, in the front region of the surge tank, that is, the front region of the engine hood, there is only the bottom part of the surge tank. There is no top part. Accordingly, in this region, the height of the engine hood can be made lower.

Therefore, according to the present embodiment, it is possible to effectively make the height of the engine hood lower even when using a surge tank with an internal space divided into a top part and a bottom part.

Note that in the specification, "front" and "rear" means the front and rear of the vehicle in which the multi-cylinder engine is arranged. Further, "top" and "upper" and "bottom" and "lower" mean the top and upper and the bottom and lower in the vertical direction of the vehicle in which the multi-cylinder engine is arranged.

In another embodiment of the present invention, the top part and bottom part of the surge tank are connected to the same intake pipe at the upstream side of intake and the top part is given an angle with respect to the bottom part so that an angle between a direction of connection of the intake pipe to the top part and a direction of connection of intake tubes to the top part becomes larger than an angle between a direction of connection of the intake pipe to the bottom part and a direction of connection of intake tubes to the bottom part.

According to the present embodiment, since the angle between the direction of connection of the intake pipe to the top part of the surge tank (hereinafter referred to as the "intake pipe connection direction") and the direction of connection of the intake tube to the top part (hereinafter referred to as the "intake tube connection direction") is made large, the direction of flow of the intake gas from the intake pipe to the intake tubes through the top part of the surge tank will not change greatly and therefore the intake gas will more easily flow through the inside of the surge tank. That is, it is possible to reduce the intake resistance with respect to the intake gas.

Therefore, according to the present embodiment, by making the angle between the intake pipe connection direction and intake tube connection direction larger at the top part of the surge tank, it is possible to make the intake resistance with respect to the intake gas smaller.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
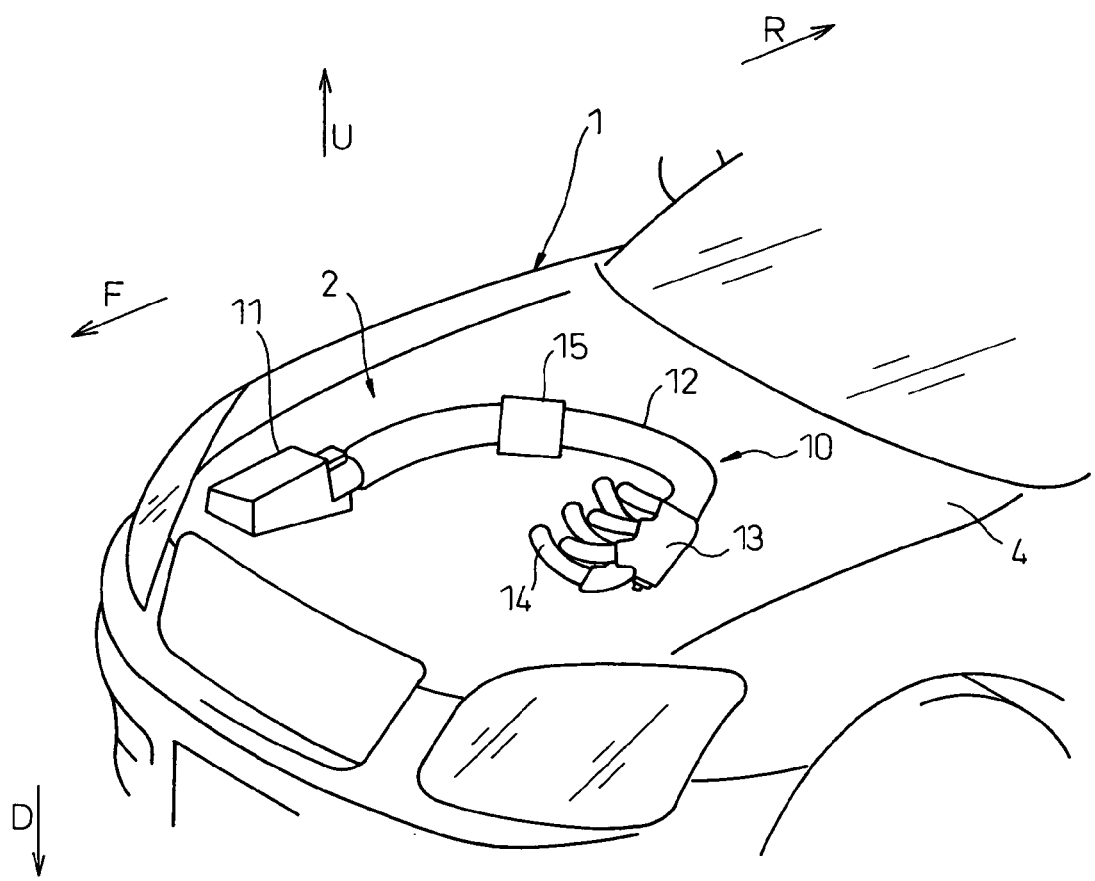
FIG. 1 shows a vehicle carrying an intake system of a first embodiment of the present invention.

Below, an intake system of a multi-cylinder engine of the present invention will be explained with reference to the drawings. FIG. 1 shows a vehicle mounting an intake system of a first embodiment of the present invention.

In FIG. 1, 1 indicates a vehicle mounting the intake system of the present invention, 2 an engine compartment in which the multi-cylinder engine is housed, and 10 an intake system of the present invention. The intake system 10 has an air cleaner 11, an intake pipe 12, a surge tank 13, and a plurality of intake tubes 14. The intake gas (intake air) passes through these and flows into the intake ports of the multi-cylinder engine. The intake pipe 12 is provided with a throttle valve 15 for adjusting the flow rate of the intake air flowing through the intake pipe 12. In the specification, the front of the vehicle 1, that is, the forward direction of the vehicle 1, is described as the "front" (direction F in FIG. 1), while the rear of the vehicle 1, that is, the reverse direction of the vehicle 1, is described as the "rear" (direction R in FIG. 1). Further, the upward direction in the vertical direction of the vehicle 1 is described as "up" (direction U in FIG. 1), while the downward direction in the vertical direction of the vehicle 1 is described as "down" (direction D in FIG. 1).

Figure 2:
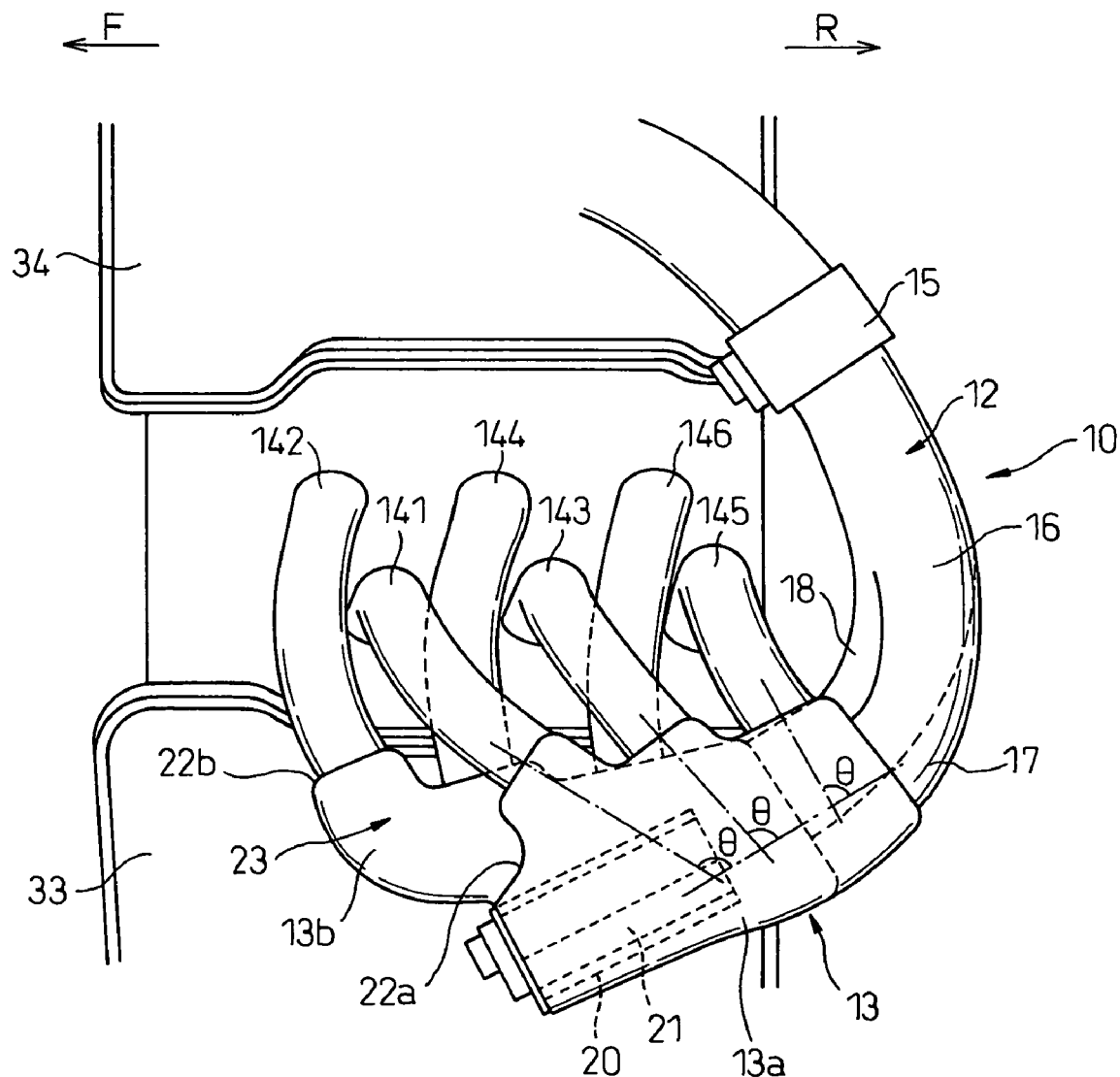
FIG. 2 is a partial plan view of an intake system of a first embodiment of the present invention.
Figure 3:
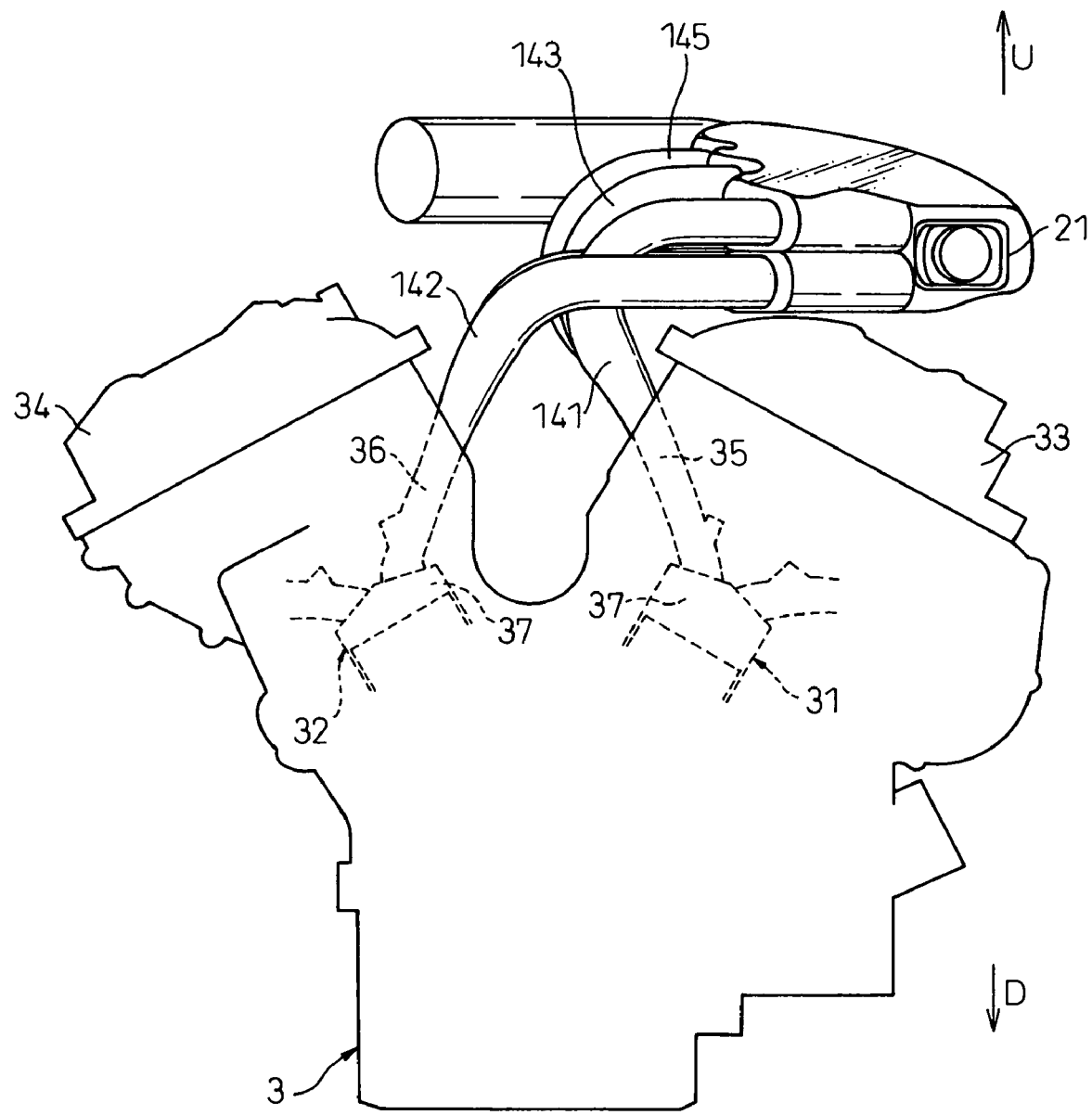
FIG. 3 is a partial front view of an intake system of a first embodiment of the present invention.
Figure 4:
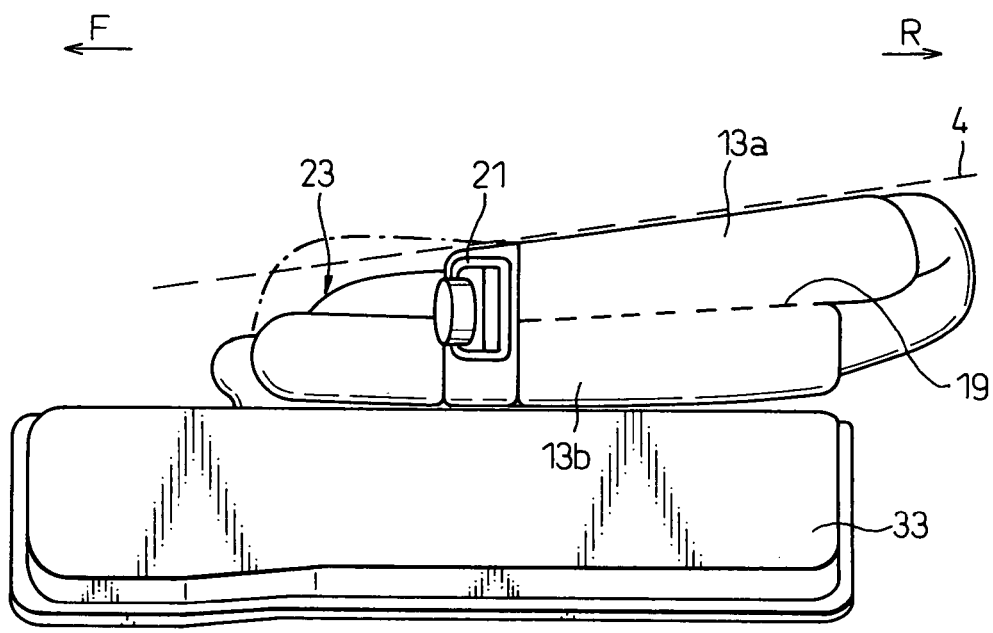
FIG. 4 is a partial side view of an intake system of a first embodiment of the present invention.
Figure 5:
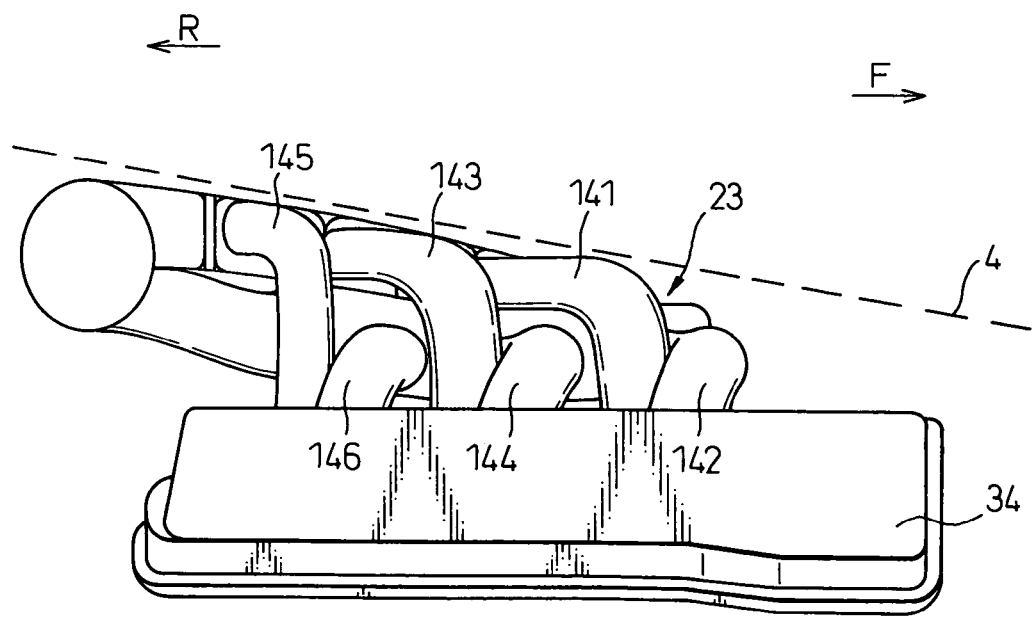
FIG. 5 is a partial side view of an intake system of a first embodiment of the present invention seen from the side opposite to FIG. 4.

FIG. 2 to FIG. 5 show an intake system 10 of a first embodiment mounted in a multi-cylinder engine. Here, FIG. 2 is a partial plan view of the intake system 10, FIG. 3 is a partial front view of the intake system 10, and FIG. 4 and FIG. 5 are partial side views of the intake system as seen from one side and the opposite side. In the illustrated embodiment, the case of using a six-cylinder V-engine, that is, an engine in which two cylinder banks each having three cylinders are arranged at a predetermined angle, is shown. Further, the engine 3 is mounted longitudinally in the engine compartment 2, that is, is arranged so that the cylinders forming the cylinder banks 31 and 32 are arranged aligned in the front-rear direction. Note that the engine able to use the intake system 10 of the present invention is not limited to the above six-cylinder V-engine. The intake system 10 may be used for any engine so long as it is a multi-cylinder engine provided with two cylinder banks formed by pluralities of cylinders (for example, an eight-cylinder V-engine, a six-cylinder horizontally opposed engine, etc.).

As shown in FIG. 2 to FIG. 5, the intake pipe 12 is branched into two branch pipes, that is, a top branch pipe 17 and bottom branch pipe 18, at an intake pipe branch part 16 downstream of the throttle valve 15. The top branch pipe 17 is positioned above the bottom branch pipe. The surge tank 13 is divided into two parts, that is, a top part 13a and a bottom part 13b, by a partition 19 (FIG. 4). The top part 13a is positioned above the bottom part 13b. The top part 13a is connected to the top branch pipe 17, while the bottom part 13b is connected to the bottom branch pipe 18. The top branch pipe 17 and the bottom branch pipe 18 are connected to the rear of the top part 13a and the rear of the bottom part 13b respectively. Further, the throttle valve 15 arranged in the intake pipe 12 is positioned above and behind the engine 3. In this embodiment, the top part 13a and the bottom part 13b are not formed separately, but are formed integrally. However, the top part 13a and the bottom part 13b may also be formed separately and then connected to form the surge tank 13.

Further, the surge tank 13 is positioned above head covers 33, 34 of the cylinder heads of the engine 3. In particular, in this embodiment, the surge tank 13 is arranged above the head cover corresponding to one cylinder bank 31 of the engine 3 (hereinafter referred to as "the first cylinder bank"). The surge tank 13 is arranged at this position for the following reason. That is, in a V-engine, the intake ports have to be arranged at the center of the engine, structurally. The lengths of the intake tubes are set for optimally obtaining the pulsation effect explained later. Further, to evenly distribute the intake gas to the cylinders, it is necessary to make the lengths of the intake tubes uniform. If satisfying these conditions while connecting the surge tank to the intake ports positioned at the center of the engine, inevitably the surge tank becomes positioned above the head covers of the cylinder heads of the engine.

The partition 19 between the top part 13a and bottom part 13b of the surge tank 13 is provided with an opening 20. Therefore, the opening 20 connects the top part 13a and the bottom part 13b through it. The opening 20 is provided with a valve 21 for opening and closing the opening 20. Therefore, when the valve 21 is opened, the top part 13a and bottom part 13b are communicated with each other, while conversely when the valve 21 is closed, the top part 13a and bottom part 13b are not communicated.

The top part 13a and bottom part 13b of the surge tank 13 are each connected to three intake tubes 141 to 146. The intake tubes 141, 143, and 145 connected to the top part 13a are connected to the cylinders of the first cylinder bank 31 through the intake ports 35 provided at the cylinder heads, while the intake tubes 142, 144, and 146 connected to the bottom part 13b are connected to the cylinders of the other cylinder bank 32 (hereinafter referred to as "the second cylinder bank") than the first cylinder bank 31 through the intake ports 36 provided in the cylinder heads.

If designating the three cylinders of the first cylinder bank 31 the #1 cylinder, #3 cylinder, and #5 cylinder from the front to the rear, these cylinders are connected to a first intake tube 141, a third intake tube 143, and a fifth intake tube 145. Further, if designating the three cylinders of the second cylinder bank 32 the #2 cylinder, #4 cylinder, and #6 cylinder from the front to the rear, these cylinders are connected to a second intake tube 142, a fourth intake tube 144, and a sixth intake tube 146. Further, the intake pipe 12 connected to the surge tank 13 is positioned further to the rear than these intake tubes 14 near the part connecting with the surge tank 13.

The valve 21 may be suitably operated to make effective use of the fluctuations in pressure in the intake passage (passage including intake tubes 14, surge tank 13, intake pipe 12, etc.) to raise the efficiency of intake to the combustion chambers 37 of the engine 3. The reason is as follows: That is, as methods for utilizing the fluctuations in pressure in an intake passage, there are the method of utilizing the pulsation effect occurring in the intake tubes 14 (inertial supercharging effect) and the method of utilizing the pulsation effect occurring in the passage from the intake tubes to the intake pipe branch part (resonant supercharging effect). The speed of the engine able to utilize these effects (hereinafter referred to as the "engine speed") is limited. Further, the engine speed where resonant supercharging occurs is lower than the engine speed where inertial supercharging occurs.

The magnitude of the inertial supercharging effect and resonant supercharging effect is affected by the magnitude of the pulsation occurring in the surge tank. That is, the larger the volume of the surge tank or the greater the number of cylinders communicated with the surge tank, the weaker the pulsation occurring in the surge tank and consequently the stronger the inertial supercharging effect, but the weaker the resonant supercharging effect. In the present embodiment, by opening the valve 21, the top part 13a and the bottom part 13b become communicated with each other and the two parts 13a and 13b function as a single surge tank. Consequently, compared with when the top part 13a and bottom part 13b function as separate surge tanks, the volume of the surge tank becomes substantially greater and the number of cylinders communicating with the surge tank becomes substantially greater, so the inertial supercharging effect becomes stronger. Conversely, by closing the valve 21, the top part 13a and the bottom part 13b become separated and these parts 13a and 13b function as separate surge tanks. Therefore, the volume of each of the parts 13a and 13b becomes smaller and the number of cylinders communicated with each of the parts 13a and 13b becomes smaller, so the resonant supercharging effect is strengthened. Accordingly, as explained above, by operating the valve 21 in accordance with the engine speed, it is possible to effectively utilize the inertial supercharging effect and resonant supercharging effect and therefore the efficiency of intake to the combustion chambers 37 is raised.

However, from the viewpoint of increasing the degree of design freedom of the vehicle 1 and of securing the field of vision of the vehicle driver, it is necessary to lower the position of the engine hood 4. In a V-engine 3, the surge tank 13 is arranged at the top, so the height of the equipment in the engine compartment 2 (including the engine, intake system, etc., hereinafter referred to as the "engine equipment as a whole") becomes high and inevitably the position of the engine hood 4 ends up becoming higher.

Therefore, to lower the position of the engine hood 4, it is necessary to lower the height of the engine equipment as a whole in the region where the surge tank is arranged. In general, however, from the viewpoint of securing the field of vision of the vehicle driver, the engine hood 4 is inclined downward toward the front, so to make the height of the engine hood 4 as a whole lower, it is necessary to make the position of the engine equipment as a whole lower the further to the front. Consequently, it is necessary to lower the position of the top surface of the surge tank 13 in particular in the front region even at the surge tank 13. Conversely, if lowering the position of the top surface of the surge tank 13 in the front region of the surge tank 13, it is possible to lower the height of the engine hood 4 as a whole.

Therefore, in the first embodiment of the present invention, the surge tank 13 has its top part 13a shifted to the rear compared with its bottom part 13b and has the top part 13b not completely overlapping the bottom part 13b. Consequently, the front end 22a of the top part 13a is positioned further to the rear compared with the front end 22b of the bottom part 13b. Accordingly, at the front region 23 of the surge tank 13, the surge tank 13 is formed by only the bottom part 13b, so at that region 23, the overall height of the surge tank 13 is lower than the region other than the front region 23. Since the overall height of the surge tank 13 in the front region 23 is low, it is possible as a result to lower the height of the engine hood 4 as a whole.

This will be clear from FIG. 4 and FIG. 5 as well. In these figures, the broken lines show the lower limit position at which the engine hood 4 can be disposed in the case of the present invention (more precisely, the lower limit position where the cushion material placed below the engine hood 4 can be arranged). As will be understood from these figures, at the front region 23 of the surge tank 13, the engine hood 4 can be arranged at a low position. In particular, FIG. 4 shows by the dot-dash lines the contours of the surge tank in the case if the top part were superposed on the bottom part of the surge tank even at the front region. Therefore, it is learned that according to the surge tank 13 of the present embodiment, the engine hood can be lowered to a position where it would otherwise end up interfering with the surge tank if arranging the top part over the bottom part.

Further, the top part 13a of the surge tank 13 is formed to become gradually higher in height the further toward the rear. Along with this, the positions where the intake tubes 141, 143, and 145 are connected to the top part 13a of the surge tank 13 become higher the further to the rear the intake tubes. On the other hand, the positions where these intake tubes 141, 143, and 145 are connected to the intake ports 35 of the engine 3 become the same in height. Therefore, the lengths in the vertical direction of the intake tubes 141, 143, and 145 connected to the top part 13a become longer the further to the rear the intake tubes. That is, as shown in FIG. 5, the lengths in the vertical direction of the intake tubes become longer in the order of 141, 143, and 145.

On the other hand, the lengths in the horizontal direction of the intake tubes 141, 143, and 145 connected to the top part 13a become shorter the further to the rear the intake tubes. That is, as shown in FIG. 2, the lengths in the horizontal direction of the intake tubes become longer in the order of 145, 143, and 141. This is due to the fact that the top part 13a is shifted to the rear and thereby the distances between connecting points of the intake tubes 141, 143, and 145 to the top part 13a become shorter than the distances between the intake ports 35 to which these intake tubes 141, 143, and 145 are connected.

In this way, in the intake tubes 141, 143, and 145 connected to the top part 13a, the further the intake tube to the rear, the longer its length in the vertical direction and the shorter its length in the horizontal direction, so as a result the lengths of the intake tubes 141, 143, and 145 connected to the top part 13a can be made equal. Accordingly, it is possible to make the distribution of intake gas to the cylinders equal and to effectively utilize the pulsation effect occurring in the intake passage to obtain a high charging efficiency.

Further, the top part 13a and bottom part 13b of the surge tank 13 are not arranged in parallel. The top part 13a is given an angle with respect to the bottom part 13b in the horizontal direction. That is, the top part 13a is shifted to be rotated by a predetermined angle toward the opposite side than the side where the intake tubes 14 are connected to the surge tank 13 along the axis near the point where the intake pipe 12 is connected to the surge tank 13. Therefore, the angle $\theta$ between the direction by which the intake tubes 14 are connected to the top part 13a (hereinafter referred to as the "intake tube connection direction") and the direction in which the intake pipe 12 is connected to the top part 13a (hereinafter referred to as the "intake pipe connection direction") becomes larger than the angle between the intake tube connection direction to the bottom part 13b and the intake pipe connection direction to the bottom part 13b for the corresponding intake tubes (for example, the second intake tube 142 for the first intake tube 141). Note that the intake pipe connection direction may be the direction in which the top branch pipe 17 is connected to the top part 13a or the direction in which the top branch pipe 17 is branched at the intake pipe branch 16.

In general, if the angle $\theta$ between the intake tube connection direction and the intake pipe connection direction to the surge tank 13 is small, the intake gas flowing from the intake pipe 12 to the surge tank 13 must flow through a sharp angle in the surge tank 13 in order to flow to the intake tubes 14. That is, the angle of bending of the flowline of the intake gas in the surge tank 13 is small. Sharp bending of the flow of the intake gas results in intake resistance and invites a drop in the flow rate of the intake gas as a result.

As opposed to this, in the present embodiment, the angle $\theta$ between the intake tube connection direction and the intake pipe connection direction to the top part 13a of the surge tank 13 is large, so the flow of the intake gas does not bend with a sharp angle and the bending angle of the flowline of the intake gas is large. Therefore, the intake resistance received by the intake gas due to bending of the flowline of the intake gas in the top part 13a becomes relatively small.

Figure 6:
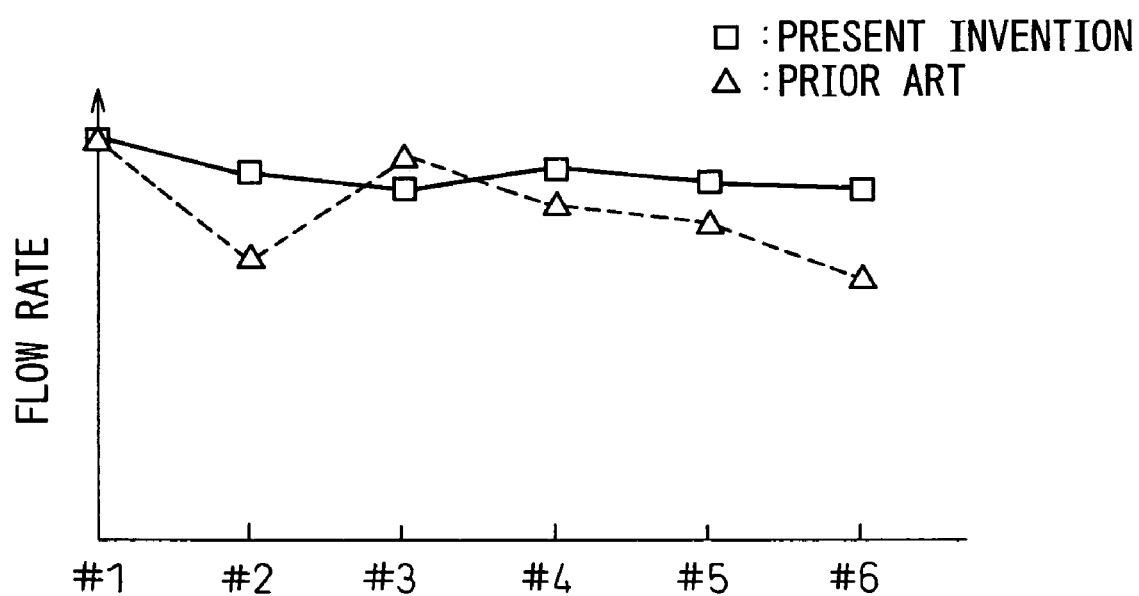
FIG. 6 is a view of the flow rates of intake gas flowing into the cylinders in the case of use of intake systems of the prior art and the present embodiment.

Here, a comparison will be made of the flow rate of the intake gas to the cylinders when using a conventional type of intake system, that is, an intake system formed so that the top part of the surge tank completely overlaps the bottom part, and using an intake system of the present embodiment. FIG. 6 shows the flow rates of intake gas to the cylinders (hereinafter referred to as "intake gas flow rate") for the case of use of a conventional type of intake system and the case of use of an intake system of the present embodiment in the state with the valve 21 opened.

As will be understood from FIG. 6, when using the intake system of the present embodiment, compared with when using a conventional type of intake system, the intake gas flow rate becomes greater in almost all of the cylinders. This is due to the small intake resistance received by the intake gas flowing through the top part 13a of the surge tank 13 in the above way. Further, in the conventional type of intake system, there is fluctuation of the intake gas flow rate between cylinders. In particular, the intake gas flow rate tends to differ between odd number cylinders (cylinders of first cylinder bank) and even number cylinders (cylinders of second cylinder bank). This is believed to be because in the conventional type of intake system, the angle between the intake tube connection direction and intake pipe connection direction at the top part of the surge tank is smaller, by a large amount, than the angle between the intake tube connection direction and intake pipe connection direction at the bottom part of the surge tank, so the intake resistance received by the intake gas flowing through the top part of the surge tank becomes considerably larger than the intake resistance received by the intake gas flowing through the bottom part. As opposed to this, in the intake system of the present embodiment, it is believed that the angle between the intake tube connection direction and the intake pipe connection direction does not become that different between the top part 13a and bottom part 13b of the surge tank 13, so fluctuation of the flow rate of intake air between the cylinders of the first cylinder bank 31 and cylinders of the second cylinder bank 32 is suppressed.

In this way, according to the first embodiment of the present invention, it is possible to maintain as is the large flow rate of intake air to the cylinders of the cylinder banks 31 and 32 and maintain the amounts of intake air substantially even among cylinders while lowering the height of the front region of the surge tank and thereby lower the attachment position of the engine hood.

Figure 7:
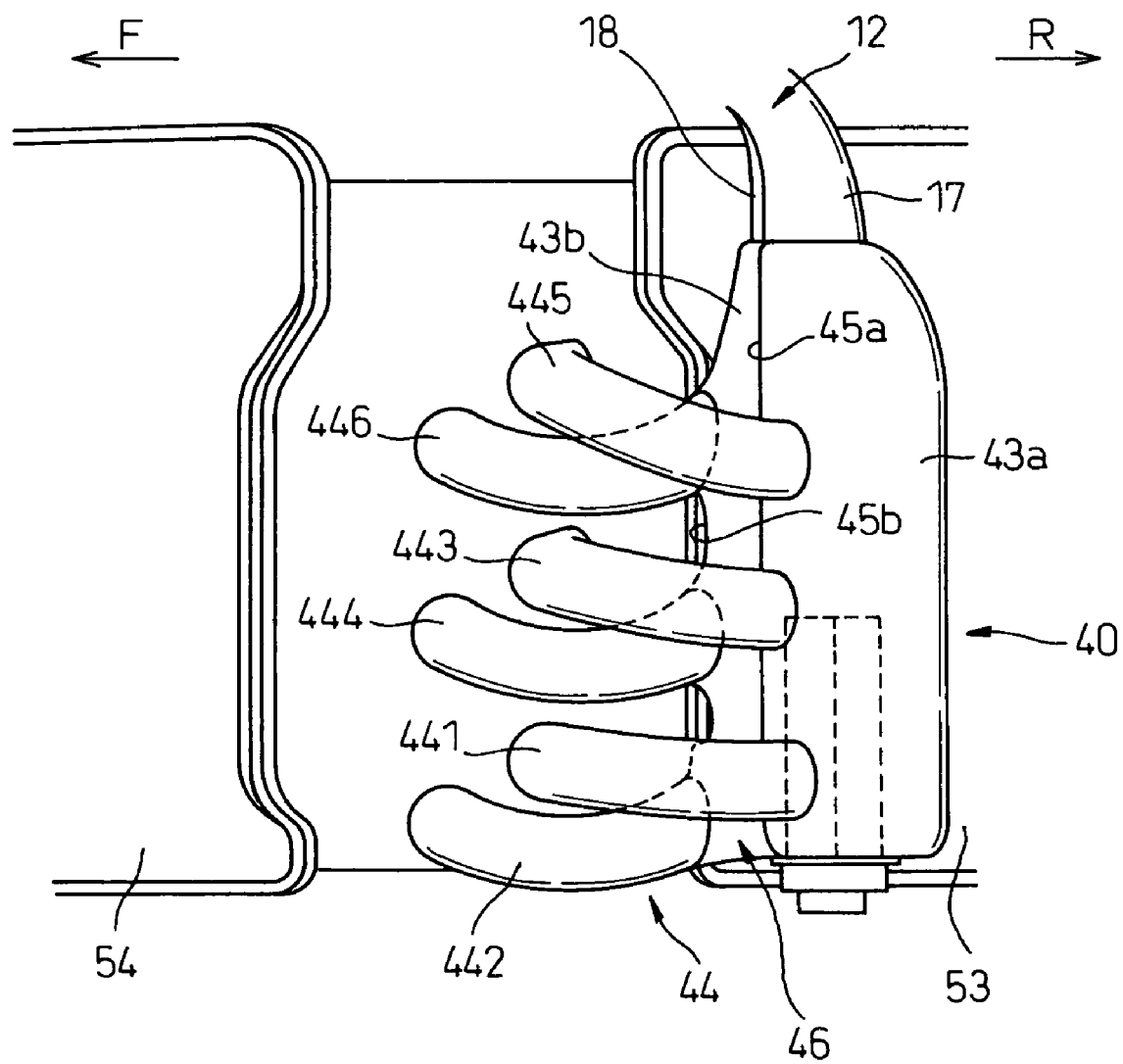
FIG. 7 is a partial plan view similar to FIG. 2 of the intake system of a second embodiment of the present invention.
Figure 8:
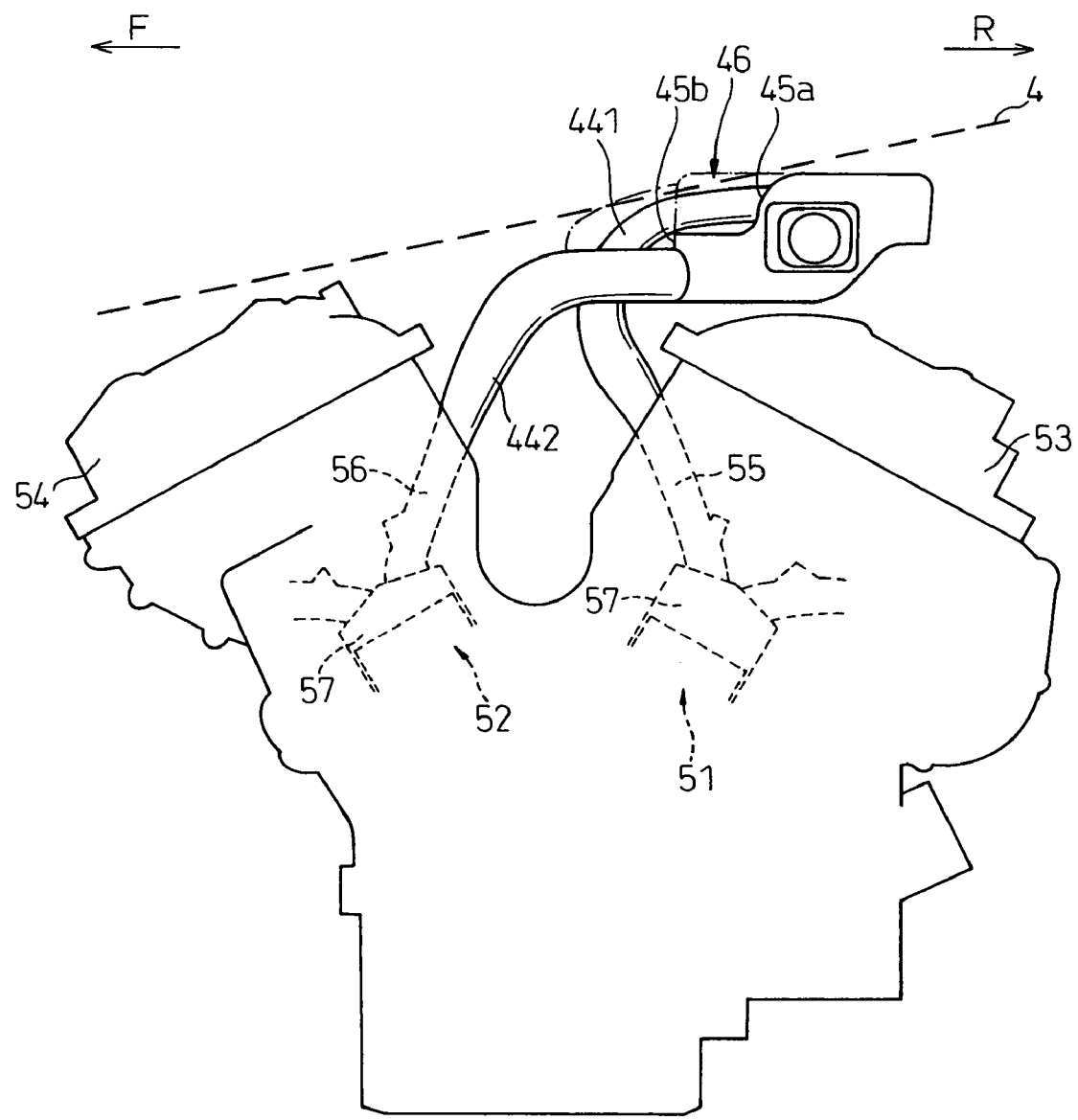
FIG. 8 is a partial side view of an intake system of the second embodiment of the present invention.

Next, an intake system of a second embodiment of the present invention will be explained with reference to FIG. 7 and FIG. 8. FIG. 7 is a plan view similar to FIG. 2 of the intake system 40 of the second embodiment, while FIG. 8 is a side view of the intake system 40 of the second embodiment. Note that in the following explanation, components similar to those of the first embodiment are assigned the same reference notations.

In the present embodiment, in the same way as the first embodiment, the case is shown of use of a six-cylinder V-engine 5, but the embodiment may also be used for any multi-cylinder engine provided with two cylinder banks comprised of pluralities of cylinders (for example, an eight-cylinder V-engine, six-cylinder horizontally opposed engine, etc.) However, in this embodiment, unlike the first embodiment, the engine 5 is mounted transversely in the engine compartment 2, that is, the cylinders forming the cylinder banks 51 and 52 are arranged aligned in the transverse direction (that is, a direction perpendicular to front-rear direction).

In the second embodiment, in the same way as the first embodiment, the surge tank 43 is divided in internal space into the two parts of the top part 43a and bottom part 43b. The top part 43a is positioned above the bottom part 43b, and the top part 43a and bottom part 43b are connected to the top branch pipe 17 and bottom branch pipe 18, respectively. The top branch pipe 17 and the bottom branch pipe 18 are connected to the sides of the top part 43a and the bottom part 43b, respectively. Further, the top part 43a and bottom part 43b are formed integrally.

Further, the surge tank 43 is arranged above the head covers 53 corresponding to the cylinder bank (hereinafter referred to as the "third cylinder bank") 51 positioned at the rear among the two cylinder banks 51, 52 of the engine 3. The top part 43a and the bottom part 43b of the surge tank 43 are each connected to three intake tubes 441 to 446 at the fronts. The intake tubes 441, 443, and 445 connected to the top part 43a are communicated with the cylinders of the third cylinder bank 51 through the intake ports 55, while the intake tubes 442, 443, and 445 connected to the bottom part 43b are communicated with the cylinders of the cylinder bank (hereinafter referred to as the "fourth cylinder bank") 52 separate from the third cylinder bank 51 through the intake ports 56.

In the intake system of the second embodiment as well, in the same way as the intake system of the first embodiment, the surge tank 43 is formed with the top part 43a shifted to the rear compared with the bottom part 43b and with the top part 43a not completely overlapping the bottom part 43b. Therefore, the front end 45a of the top part 43a is positioned more toward the rear compared with the front end 45b of the bottom part 43b. Accordingly, the surge tank 43 is comprised of only the bottom part 43b at the front region 46 of the surge tank 13, so the overall height of the surge tank 43 at the front region 46 is lower than the region other than the front region. Therefore, the height of the engine hood 4 as a whole can be lowered.

This is clear from FIG. 8 as well. In the figure, the broken line shows the lower limit position where the engine hood 4 can be arranged in the present invention in the same way as in FIG. 4 and FIG. 5. As clear from this figure, it is possible to arrange the engine hood 4 at a low position in the front region 46 of the surge tank 43. The dot-chain line in the figure shows the contours of the surge tank if arranging the top part over the bottom part of the surge tank in the front region as well. From this figure, according to the present embodiment, it is learned that it is possible to lower the engine hood down to a position which would end up interfering with the surge tank if arranging the top part over the bottom part.

While the invention has been described with reference to specific embodiments chosen for purpose of illustration, it should be apparent that numerous modifications could be made thereto by those skilled in the art without departing from the basic concept and scope of the invention.

What is claimed is:

1. An intake system of a multi-cylinder engine provided with two cylinder banks each comprised of a plurality of cylinders,
    provided with a surge tank arranged at a position higher than cylinder heads of said multi-cylinder engine when said intake system is attached to said multi-cylinder engine and divided in internal space into a top part and a bottom part and with pluralities of intake tubes communicating said surge tank and intake ports of said multi-cylinder engine;
    intake tubes communicated with one cylinder bank of said multi-cylinder engine being connected to the top part of said surge tank and intake tubes communicated with the other cylinder bank being connected to the bottom part of said surge tank;
    said surge tank being formed so that a front end of said top part is positioned further toward a rear side of the vehicle compared with a front end of the bottom part when said intake system is mounted to a multi-cylinder engine mounted in the vehicle.

2. An intake system of a multi-cylinder engine as set forth in claim 1, wherein the top part and bottom part of said surge tank are connected to the same intake pipe at the upstream side of intake and said top part is given an angle with respect to said bottom part so that an angle between a direction of connection of said intake pipe to said top part and a direction of connection of intake tubes to said top part becomes larger than an angle between a direction of connection of said intake pipe to said bottom part and a direction of connection of intake tubes to said bottom part.

\* \* \* \* \*